(No Model.)  6 Sheets—Sheet 1.

A. T. ANDERSON.
NETTING MACHINE.

No. 244,159.  Patented July 12, 1881.

WITNESSES
Alfred B. Parker
Frank G. Parker

INVENTOR
Albert T. Anderson (No Model.) 6 Sheets—Sheet 3.
A. T. ANDERSON.
NETTING MACHINE.
No. 244,159. Patented July 12, 1881.

WITNESSES
Alfred B Parker
Frank G. Parker.

INVENTOR
Albert T. Anderson (No Model.)  6 Sheets—Sheet 4.

A. T. ANDERSON.
NETTING MACHINE.

No. 244,159. Patented July 12, 1881.

WITNESSES
Alfred B Parker
Frank G. Parker

INVENTOR
Albert T. Anderson (No Model.) 6 Sheets—Sheet 5.

A. T. ANDERSON.
NETTING MACHINE.

No. 244,159. Patented July 12, 1881.

WITNESSES
Alfred B Parker
Frank G. Parker

INVENTOR
Albert T. Anderson (No Model.)
6 Sheets—Sheet 6.
A. T. ANDERSON.
NETTING MACHINE.
No. 244,159.
Patented July 12, 1881.
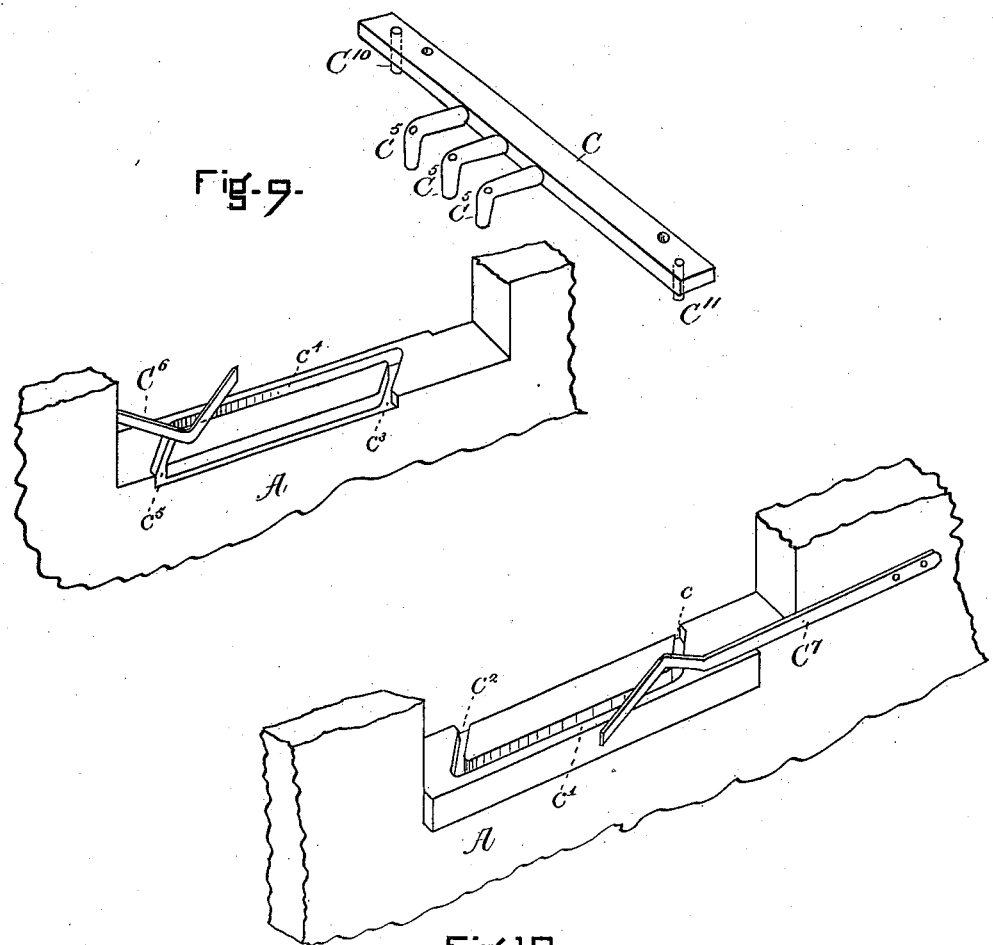

UNITED STATES PATENT OFFICE.

ALBERT T. ANDERSON, OF CHELSEA, ASSIGNOR TO EDWARD KEELER, OF BOSTON, MASSACHUSETTS.

NETTING-MACHINE.

SPECIFICATION forming part of Letters Patent No. 244,159, dated July 12, 1881.

Application filed February 14, 1881. (No model.)

*To all whom it may concern:*

Be it known that I, ALBERT T. ANDERSON, of Chelsea, in the county of Suffolk and State of Massachusetts, have invented certain new and useful Improvements in Netting-Machines, of which the following is a specification.

My invention relates to that class of netting-machines in which a series of knots extending entirely across the web are made, the web then being fed forward the required distance for forming the next series.

Figure 1:
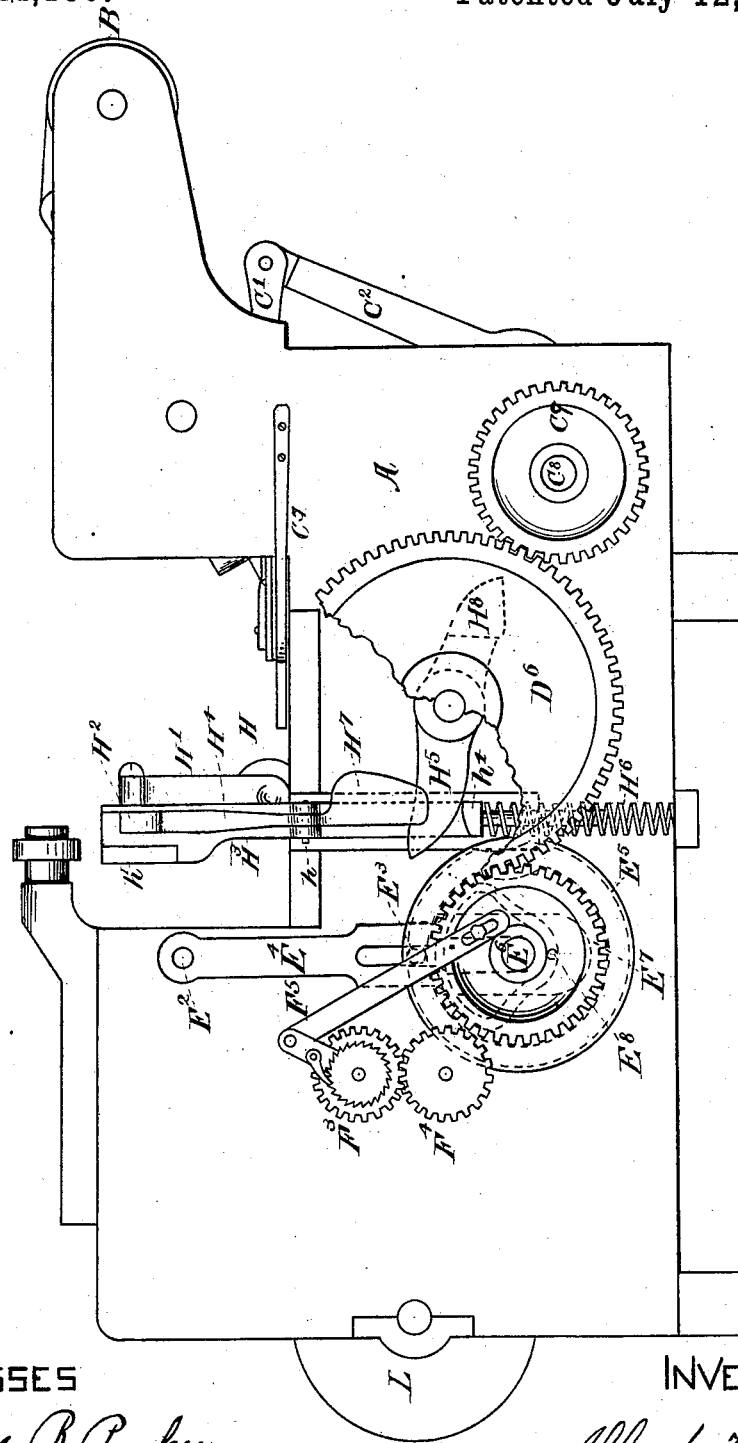
Figure 2:
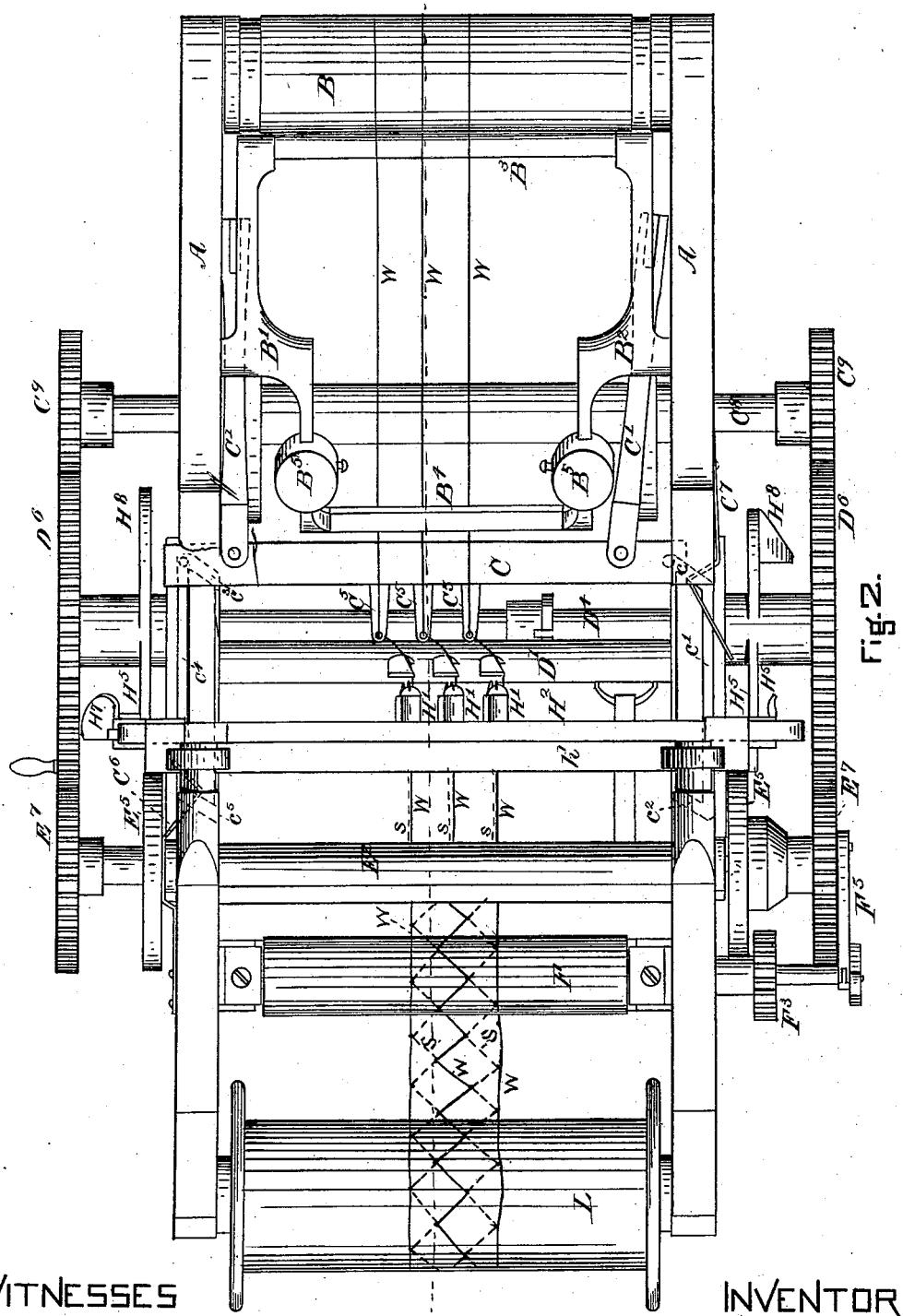
Figure 3:
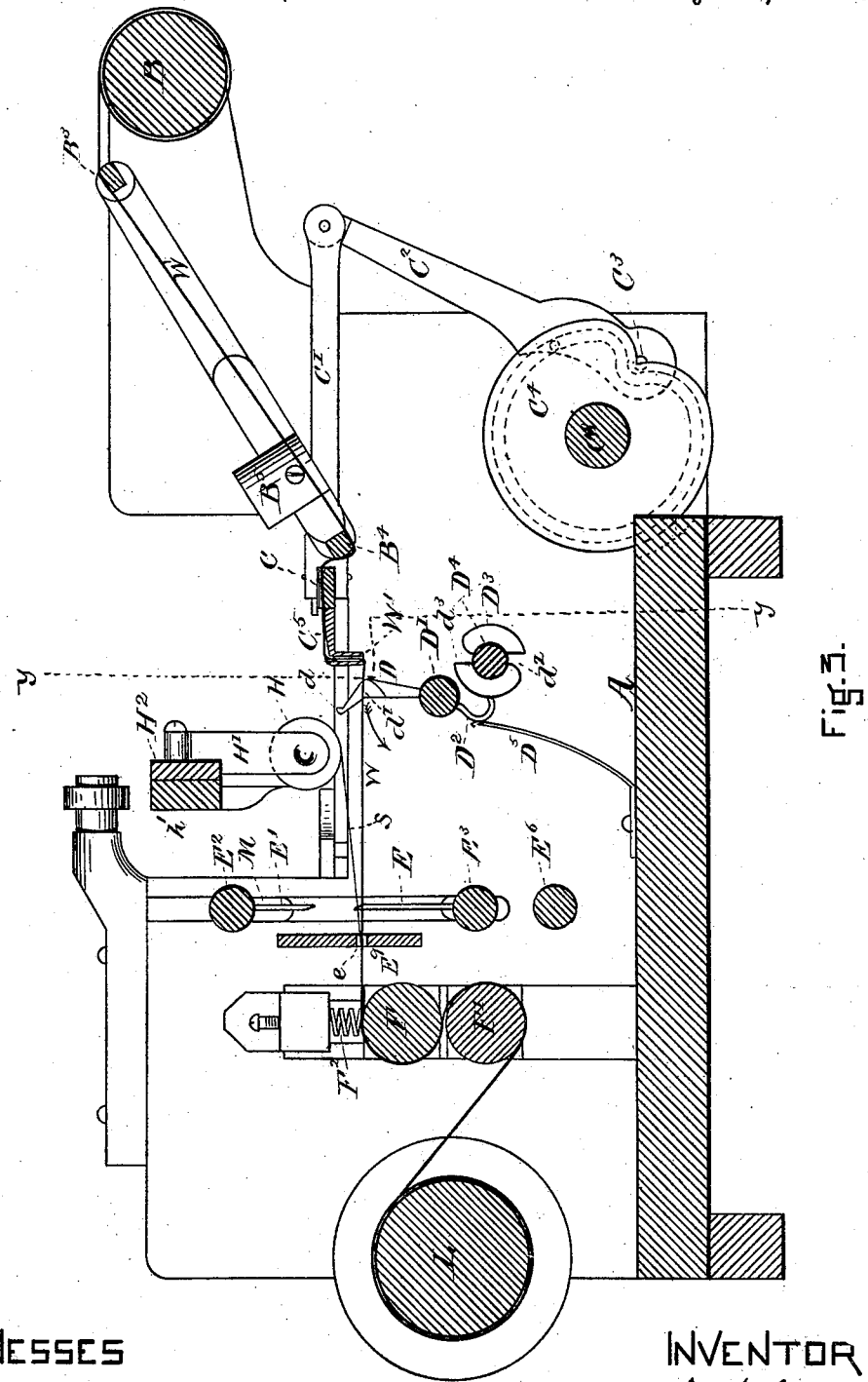
Figure 4:
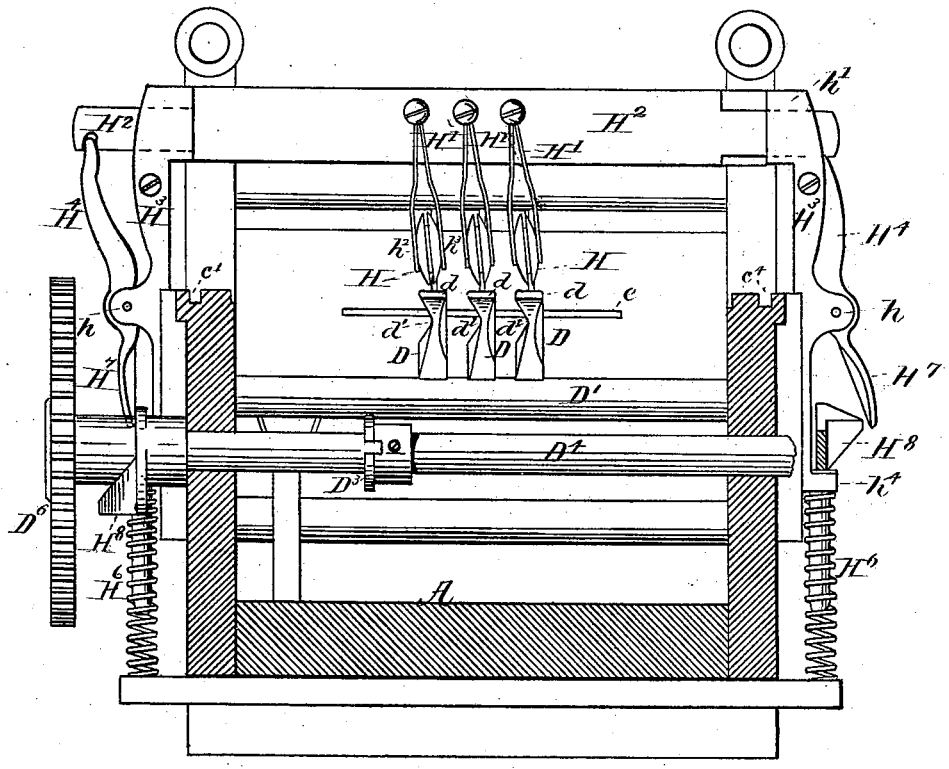
Figure 5:
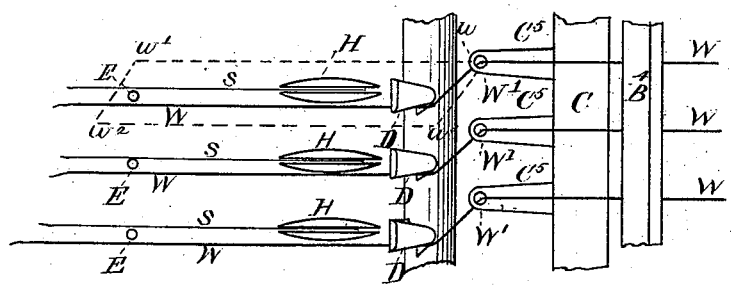
Figure 6:
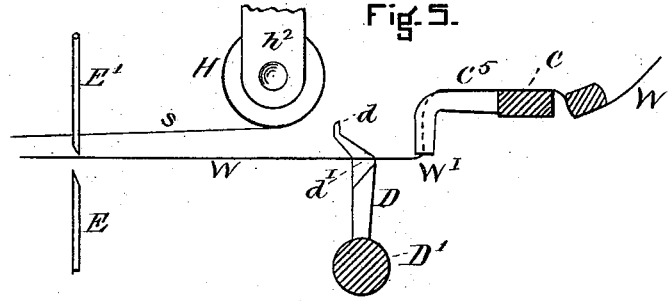

Figure 1 is a side elevation of my machine, parts being represented as broken out. Fig. 2 is a plan of the same. Fig. 3 is a longitudinal vertical section taken on line $x\ x$ of Fig. 2. Fig. 4 is a cross-section of parts and elevation of parts, taken on line $y\ y$ of Fig. 3. Figs. 5, 6, 7, and 8 are sketches to illustrate the knot-forming action of the machine. Fig. 9 is a perspective view, showing the moving cross-bar to which the warp-cord carriers are attached, also showing the guiding-pins at the end. Fig. 10 shows in perspective the channels in which the guiding-pins of the cross-bar move, also the springs which force the guide-pins to move in the desired direction.

A represents the frame of the machine.

B, Figs. 1, 2, and 3, represents the warp-roll around which all of the warp-cords are placed. This roll may be furnished with weights, springs, or some other frictional device for giving the proper tension.

$B'\ B^2\ B^3\ B^4$, Fig. 2, show a weighted take-up device. This device is also shown in section in Fig. 3, and is provided with adjustable weights $B^5$, Figs. 2 and 3.

C, Figs. 2, 3, and 9, is a cross-bar which serves to sustain and give motion to the warp-cord carriers $C^5$, (the number of these carriers to agree, of course, with the number of warp-cords.) This bar C moves forward in a horizontal plane nearly to the end of its stroke. Then it moves forward and laterally; thence backward to nearly the end of its rearward stroke; thence backward and laterally to the completion of its stroke, the motion being of that kind known among mechanics as a "four-way" motion. The bar C, in its movements, as above described, is guided by means of pins $C^{10}\ C^{11}$, Fig. 9, which project downwardly from it, one at each end. One of these pins traverses in the channel $c\ c'\ c^2$, Figs. 2 and 10, while the other one traverses in the channel $c^3 c^4 c^5$, Figs. 2 and 10. In the forward movement of the bar C the guiding-pin $C^{10}$ is in the channel $c^4$, and continues there until it comes in contact with the bent spring $C^6$, Figs. 2 and 10, which throws the guiding-pin out of the channel $c^4$ into the channel $c^5$, at the same time causing the bar C to take a lateral motion endwise to itself, so as to cause the guiding-pin $C^{11}$ in the opposite end of the bar C to pass through the channel $c^2$ to the channel $c'$. This pin now becomes the guide and continues to be the guide through the backward stroke; but when it comes in contact with the spring $C^7$ it is thrown out through the channel $c$, and the first-mentioned pin slides through the channel $c^3$ to the channel $c^4$, which again becomes the guiding-channel. Motion is communicated to the bar C by means of the link $C'$, Figs. 1, 2, and 3, the lever $C^2$, pivoted at $C^3$, and the cam $C^4$. A groove in the cam $C^4$ operates upon a projecting pin on the lever $C^2$.

$C^5\ C^5$, Figs. 2, 3, and 9, are a series of cord-carriers attached to the bar C. Each of these cord-carriers is bent at right angles, and is provided with an orifice or eye through which the cord passes. (See Fig. 3.)

D D represent a series of cord and loop holders, shaped as shown in Figs. 2, 3, 4, 7, and 8, which are all attached at their lower ends to a rocker-shaft, $D'$. These cord and loop holders D are held in a vertical position by means of the bent lever $D^2$ and spring $D^5$, the end of the bent lever $D^2$ resting upon a wheel, $D^3$, said wheel having two notches, $d^2\ d^3$, cut into it, so that at proper intervals the end of the lever $D^2$ may be pushed by the action of the spring $D^5$ into them, thus allowing the upper end of the looper and holders D to swing forward, as indicated by the arrow, (see Fig. 3,) and drop the loop. The notched wheel $D^3$ is attached to a shaft, $D^4$, (see Figs. 1, 2, and 3,) said shaft being driven by the gear-wheel $D^6$.

E E, Figs. 3, 6, 7, and 8, represent a series of vertical pins, which serve as loop-holders, and are attached to a cross-bar, $E^3$, Fig. 3, and receive from this cross-bar a vertical motion at proper intervals. This vertical motion is communicated to them by a cam-groove in the cam $E^5$, Fig. 1, there being two of these cams, one at each end of the bar E³. These cams E⁵ are attached to the shaft E⁶, which is driven by the gear E⁷, Fig. 1.

E' E' are a series of pins, (see Figs. 3, 6, 7, and 8,) which are placed severally over the corresponding loop-holding pins E, and which are attached to a cross-bar, E², which is caused to move up and down at intervals by means of links, one of which is shown at E⁴, Fig. 1. The links E⁴ are operated by a pin, E⁸, Fig. 1, which works in a second groove made in the cam E⁵. The ends of the bars E³ and E² are reduced in size, so as to pass through slots in the frame of the machine, one of these slots being shown at M, Fig. 3. The ends of these sets of pins E E' are beveled, as shown, so that when they come together an overlapping joint is formed, it being necessary to have an overlap of some kind, so as to retain the cord while the knot is being tied.

The narrow slot $e$ made in the cross-piece E⁹, Figs. 3 and 4, serves to prevent the completed fabric from moving up or down, and thus to keep all of the cords in such a horizontal position as will admit of the proper action of the knot-forming parts of the device.

The rolls F F', Fig. 3, are geared together by spur-gears F³ F⁴, (see Fig. 1,) and are operated by a link and pawl device, F⁵, Fig. 1. These rolls move intermittently and serve to withdraw the completed net as often as a series of knots are made by the machine. The roll L serves as a receiver for the completed net.

H H represent a series of shuttles placed in shuttle-carriers H', each of these shuttle-carriers being attached, by any convenient method, to the shuttle-bar H², Figs. 1, 3, and 4. This shuttle-bar H² slides in a frame, $h'$ H³. (See Figs. 1 and 4.) This frame $h'$ H³ H³, which we will call the "shuttle-frame," slides vertically in ways attached to the side of the machine, one of these ways being shown in Fig. 1. Two springs, H⁶ H⁶, (see Fig. 4,) are attached to the lower ends of the parts H³ H³, and serve to throw the shuttle-frame upward, it being drawn down by cams, one of which, H⁵ H⁸, is shown in Fig. 1. These cams are attached to the shaft D⁴, one at each end, and in revolving come in contact with the shoulder $h^4$, Fig. 4, made on the lower end of the piece H³.

H⁴ H⁷ H⁴ H⁷ are two levers attached to the shuttle-frame, and pivoted at $h$, as shown in Figs. 1 and 4. The upper ends of these levers H⁴ H⁷ are connected to the shuttle-bar H², (see Fig. 4,) their lower ends being operated upon by wedge-shaped projections H⁸ H⁸ (shown in Figs. 1 and 4) on the alternate ends of the cams H⁵ H⁸. As these cams revolve they alternately, at each half-revolution, act upon the levers H⁴ H⁷, and thus move the shuttle-bar H² laterally. This lateral movement of the shuttle-bar always takes place when the shuttle-frame is at its highest point.

Figure 7:
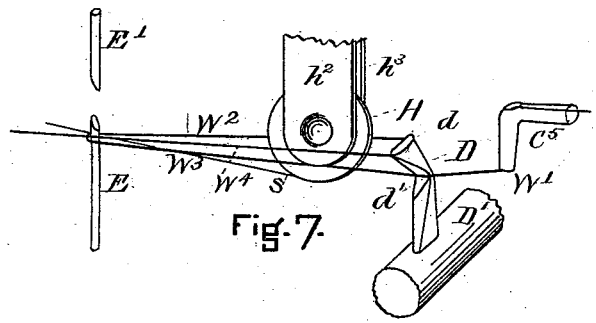
Figure 8:
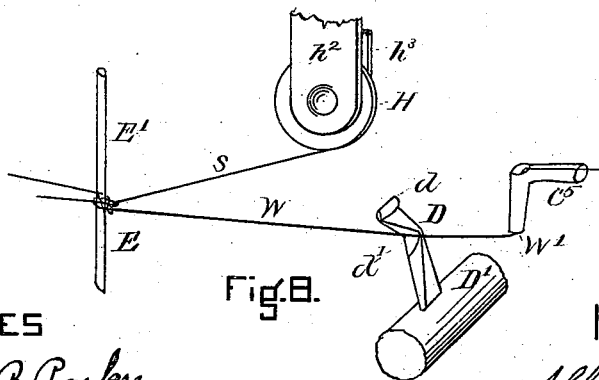

I prepare my machine for operation as follows: The warp-cords are drawn from the roller B over the part B³ and under the part B⁴ of the take-up, (see Fig. 3,) thence through the carriers C⁵, past the loopers, through the opening $e$, over the roll F, and between it and the roller F'; thence partly around and under the roller F', and thence to the receiving-roll L, to which they are fastened. The shuttle-spools H are filled with cords and placed in the carriers H'. We will suppose the parts of the machine to be in the position shown in Figs. 1, 2, 3, 4, 5, and 6. Now the machine starts, the first movement being that of the warp-carriers C⁵, the eyes W' of these carriers traversing and carrying the cords through paths indicated by $w\, w'\, w^2\, w^3$ to $w$. (See Fig. 5.) This operation when completed leaves the warp-cord with a loop formed at $d$ on the loop-holder D, and with a loop on the pin E, and also with the part W³, as shown in Fig. 7. All other parts of the knotting devices having remained stationary up to this time—that is, until the warp-cord has assumed the position represented in Fig. 7—the shuttles now move downward, being so placed, adjusted, and inclined (see Fig. 4) that the cord W³, Fig. 7, slips between the shuttle and the side $h^2$ as the shuttle descends; but as the shuttle ascends the warp-cord W³ passes between the shuttle and the side $h^3$. From the fact that the shuttle is inclined, as shown in Fig. 4, (the path of the upper part of the shuttle is on one side of the warp-cord W⁴ and the path of the lower part of the shuttle is on the other side,) the shuttle in descending will pass upon one side of the cord, and in ascending will pass upon the other side, thus placing the shuttle-cord S around the warp-cord W³. While this operation has been taking place the pins E and E' have closed and the looper D has swung downward, so as to release the loop formed by the cord W² W⁴. The take-up device will draw the cords about the pins E E' and form the knot, as shown in Fig. 8. At the next movement the pins E and E' open and the knot slips off; then the feeding action of the pawl device F⁵ takes place and draws the fabric the desired distance for one mesh.

By a careful examination of Fig. 7 it will be seen that from the peculiar shape of the looper and holder D, referring especially to the deep lateral notch $d'$, the warp-cord W³ is located in a vertical plane which passes through the middle space between the threads W² W⁴, so that the shuttle may pass and repass through the loop formed by the cords W² W⁴ without affecting either, its action being entirely upon the cord W³. One series of knots having been tied by the process above described, a second series is formed, the action being in all respects the same, except that while the shuttle-bar is up it is thrown over by one of the levers H⁷ H⁴, so that each shuttle will act upon a different warp-cord, so as to produce a diagonal mesh. At the third movement the shuttles act upon the same warp-cords that they acted upon in the first movement, each shuttle acting alternately upon one of two warp-cords. The knot produced is of the kind called the "weaver's knot."

I claim as my invention—

1. In a netting-machine, the combination of the single warp-roller B and the take-up B' B² B³ B⁴ with the bar C, warp-carriers C⁵ C⁵, link C', lever C², and cam C⁴, all operating together substantially as described, and for the purposes set forth.

2. In a netting-machine, the combination of the four-way-movement bar C, link C', lever C², and cam C⁴, the pins C¹⁰ C¹¹, frame A, provided with channels $c$ $c'$ $c^2$ $c^3$ $c^4$ $c^5$, springs C⁶ C⁷, and the carriers C⁵, with the cord and loop holders D, and the loop-holding pins E E', all operating together substantially as described, and for the purposes set forth.

3. In a netting-machine, the combination of the pins E', the cross-bar E², and its operating mechanism with the pins E, cross-bar E³, and its operating mechanism, all operating together substantially as described, and for the purposes set forth.

4. In a netting-machine, the combination of the shuttle-bar H², mechanism for moving the same laterally and vertically, and the inclined shuttle-carriers H', with the shuttles H, substantially as described, and for the purpose set forth.

5. In a netting-machine, the combination of the looper D, having a broad loop-holder, $d$, and the cord-holding notch $d'$, and mechanism for oscillating the same, with the shuttle H and carrier H', all operating together substantially as described, and for the purpose set forth.

ALBERT T. ANDERSON.

Witnesses:
FRANK G. PARKER,
ALFRED B. PARKER.